Figure 3:
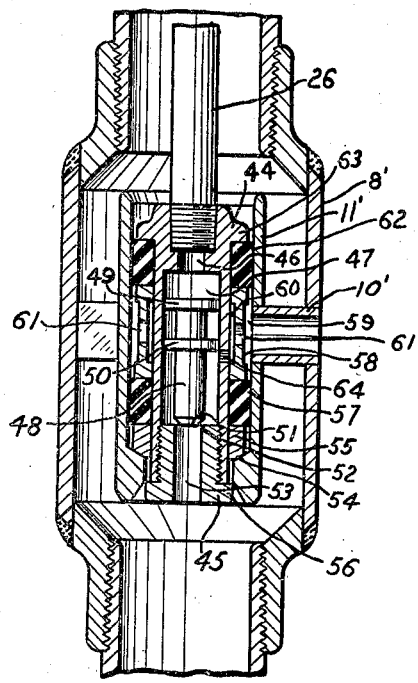

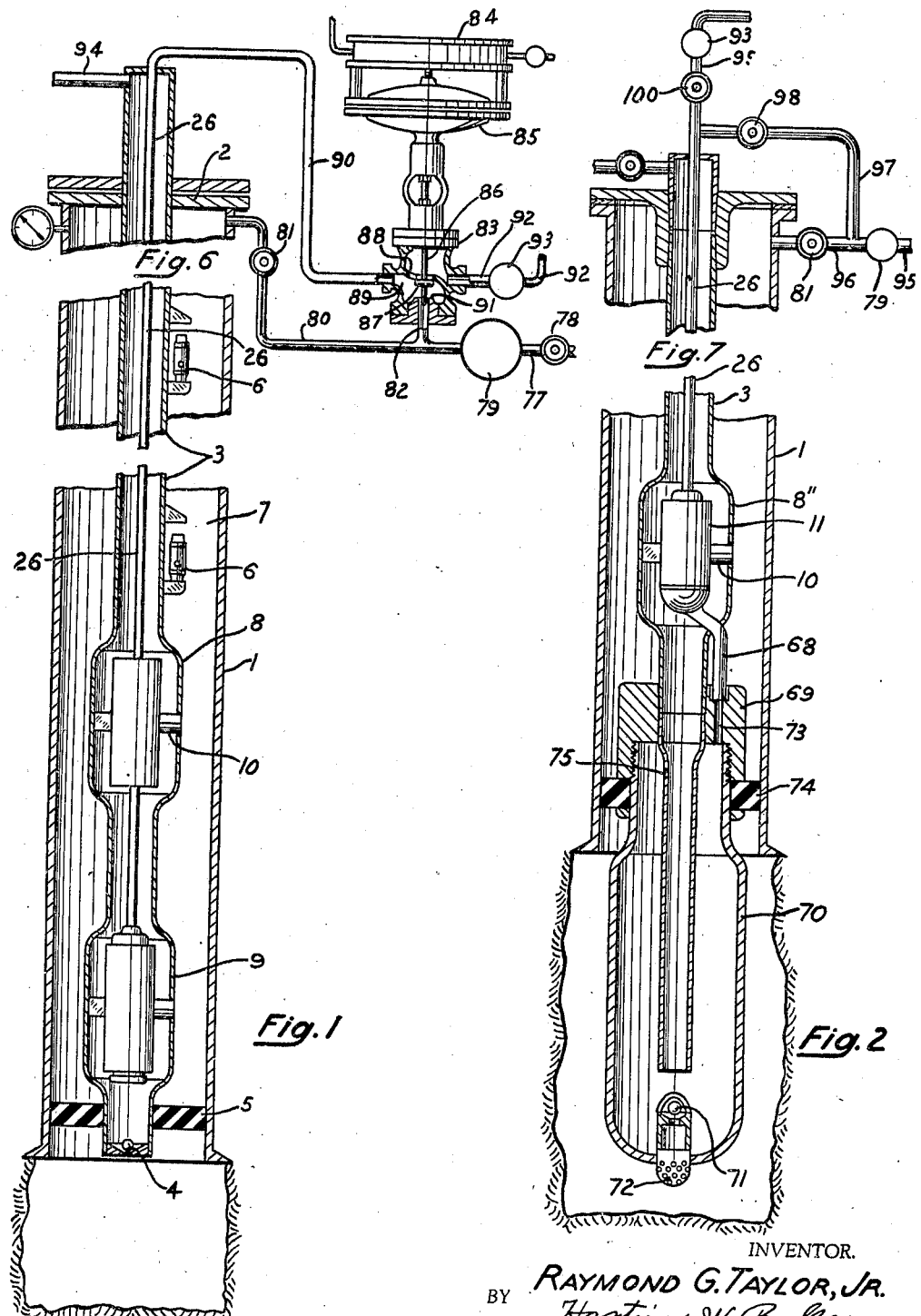

April 25, 1944.  R. G. TAYLOR, JR  2,347,620
SURFACE OPERATED FLOWING MEANS FOR WELLS
Filed April 2, 1941  2 Sheets-Sheet 2

INVENTOR.
RAYMOND G. TAYLOR, JR.
BY Hastings W. Baker
ATTORNEY.

Patented Apr. 25, 1944

2,347,620

UNITED STATES PATENT OFFICE 2,347,620

SURFACE OPERATED FLOWING MEANS FOR WELLS

Raymond G. Taylor, Jr., Dallas, Tex., assignor to The Guiberson Corporation, Dallas, Tex., a corporation of Delaware Application April 2, 1941, Serial No. 386,466

19 Claims. (Cl. 103—234)

The object of this invention is to provide means controlled from the surface of the ground at the top of a well for opening or closing a passageway leading from a compressed air chamber into the flow line whereby the oil in the flow line may be aerated and lifted to the surface. The invention will also be applicable to the mechanism whereby the compressed air may be introduced into the tubing and the oil lifted to the surface from the casing. Ordinarily, however, the compressed air would be introduced into the casing and the oil in the tubing would be lifted to the surface and ejected.

More specifically the invention relates to a control mechanism whereby a valve may be inserted into or removed from the flow line and which valve is differentially operated by fluid pressure, the fluid pressure being controlled by means above the ground. In my preferred construction I have a pressure chamber for compressed gas, which pressure chamber is between the casing and the flow line, and within the flow line is a small pipe commonly known in the trade as macaroni tubing, which macaroni tubing carries a valve mechanism. I provide means to control the gas pressure in the macaroni tubing and provide a valve in the housing carried by the macaroni tubing which valve is subjected to the gas pressures in the macaroni tubing and the gas pressures in the casing so that the said valve may be opened when the pressures in the macaroni tubing are less than the pressures in the casing and which valve will be closed when these pressures are equal or if the pressures in the macaroni tubing exceed the pressures in the casing.

Another object of the invention is to provide a valve mechanism which may be easily inserted in or removed from the flow line.

Another object of the invention is to provide a means to properly position the valve housing in regard to a port leading from the casing into the tubing and to lock the same in said position.

Another object of the invention is to provide novel packing means for the valve housing, the said packing means being positioned between the said valve housing and a sleeve carried by the flow line.

Another object of the invention is to provide, if desired, a series of sleeves in the flow line at spaced vertical distances and to provide a single macaroni tubing carrying a valve mechanism which may be moved into any one of said sleeves and locked therein and a valve means carried by each of said sleeves which will automatically be opened when the said mechanism is positioned in its sleeve and will be closed when said mechanism is moved out of said sleeve.

Other objects and advantages of the invention will appear in the detailed specification and claims which follow.

Figure 5:
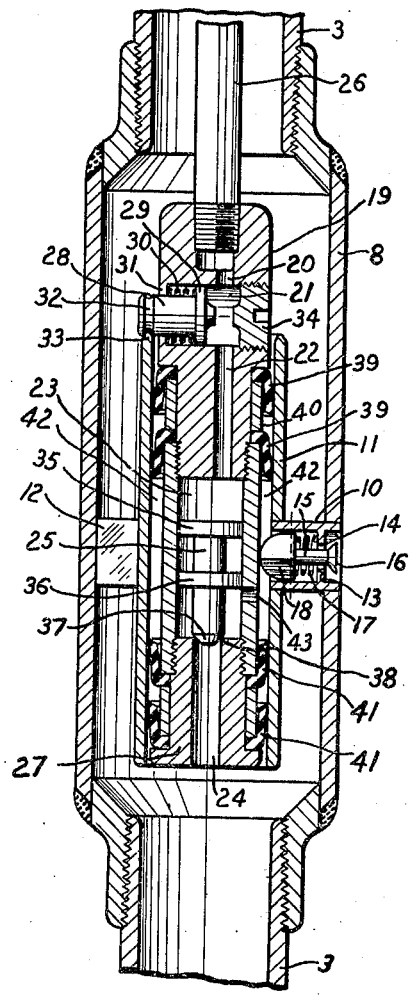
Figure 4:
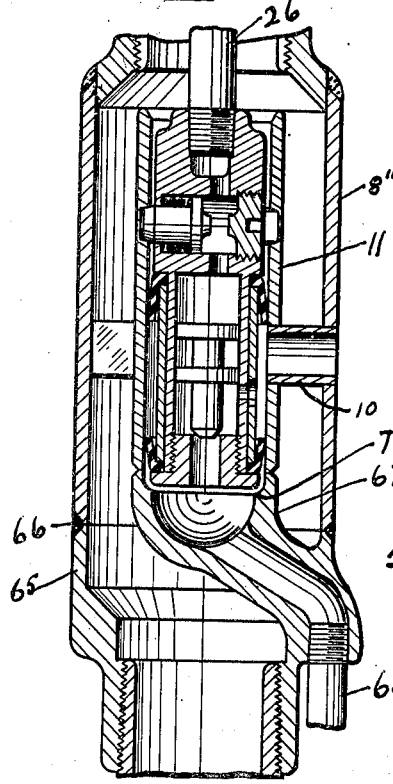
Figure 8:
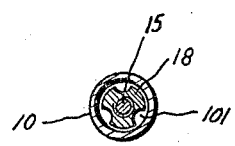

In the drawings in which I have shown the preferred construction of my invention by way of illustration and with the full realization that many changes might be made in the specific construction therein shown without departing from the spirit of the invention, Fig. 1 is a vertical elevational view partly in cross-section of a fragment of the well casing, flow line and the mechanism forming the subject-matter of this invention positioned in the flow line, Fig. 2 is a similar view of an alternative construction, Fig. 3 is an enlarged view principally in cross-section of an alternative valve arrangement, Fig. 4 is a cross-sectional elevational view of the valve housing mechanism shown in Fig. 2, Fig. 5 is an elevational view principally in cross-section of one of the valve mechanisms shown in Fig. 1, Fig. 6 is a side elevational view partly in cross section of one form of surface controlled mechanism with its connections to the macaroni tubing and casing, Fig. 7 is a view similar to Fig. 6 but of an alternative form of surface controlling means, and Fig. 8 is a cross-section view of the pipe 10 and the knob 18 showing gas passage flutes 101 in the knob 18.

Referring more in detail to the drawings, the casing 1 is capped at its top by a closure 2 through which extends the conventional flow line 3, the flow line extending to near the bottom of the well and being provided at its lower end with the valve 4 which will permit the oil from the producing formation to flow into the flow line but will prevent the oil in the flow line from flowing downwardly by said valve and back into the formation. If desired, a packer 5 may be positioned between the flow line and the casing and preferably near the lower end of the flow line. Fluid responsive flow valve 6 may be carried by the flow line, said flow valves serving the well known function of allowing the compressed gas in the compressed air chamber 7 to flow through said valves into the tubing when the head of oil in the tubing exerts a predetermined pressure on said valve. Inasmuch as the function of such valves is well understood in the art, further description is not considered to be necessary.

As shown in Fig. 1, the flow line may be provided with a series of enlarged chambers 8 and 9. As best shown in Fig. 5, a short pipe 10 passes through one wall of the chamber 8 and through a sleeve 11 which extends vertically and which has a bore or vertically extending pasageway therethrough, which bore is somewhat smaller than the internal diameter of the flow line 3. If desired, the sleeve 11 may be supported by inwardly extending lugs 12 carried by the chamber 8 so as to securely position the sleeve in the said chamber. The pipe 10 is provided with an annular internal flange 13 forming a valve seat 14 and through which extends a valve stem 15 carrying a valve 16 adapted to seat against the valve seat 14 and to prevent the compressed gas passing from the chamber 7 into the sleeve 11. The said valve is urged to its closed position by means of a spring 17 interposed between the said flange 13 and a knob 18 carried by the valve stem 15 and which knob is semi-spherical on its end remote from the valve 16 and which semi-spherical end of the knob normally projects within the sleeve 11. As will hereinafter be described, I provide a removable valve mechanism which may be lowered into the sleeve 11 and which will be adapted to engage the semi-spherical end of the knob 18 and open the valve 16, but when the valve mechanism is removed from the sleeve 11, the spring 17 will close the said valve 16.

Extending to the top of the well is a macaroni tubing 26. Macaroni tubing is generally known in the art as tubing having a diameter smaller than 1½", but by macaroni tubing I simply mean a small pipe. The lower end of the macaroni tubing is connected to a valve housing 19. This valve housing is provided with a vertically extending passageway 20, a horizontally extending bore 21 extending only a portion of the way through the housing, a vertically extending passageway 22, an enlarged valve chamber 23, and below the valve chamber is provided with a vertically extending bore 24, all of said bores, chamber and passageway communicating with each other except for a valve 25 which is positioned in the valve chamber 23. In practical manufacturing, of course, the valve housing would not be made in one piece, the upper end thereof having the connection with the macaroni tubing 26 and including the passageway 20, bore 21 and passageway 22 might be made in one piece which would be secured to a pipe forming the valve chamber 23 and this pipe might be secured at its lower end to a plug 27 through which the bore 24 extends.

In the bore 21 is a plunger 28 provided with a head 29 which serves the purpose of a piston. A spring 30 is positioned between the head 29 and a flange 31 through which flange the plunger 28 extends. The outer end of the plunger is provided with a channel 32 adapted to seat against the upper end 33 of the sleeve 11 when the parts are in the position as shown in Fig. 5. A plug 34 forms a closure for the bore 21 at the end remote from the said plunger. This plug 34 is provided so that the plunger may be inserted in the bore 21 and after being inserted the plug 34 may be screwed into the bore 21 so that the bore 21 now forms a trap to prevent the compressed air passing laterally out of the housing 19.

The valve 25 is provided with upper and lower flanges 35 and 36, respectively, which form substantially an air-tight engagement with the side walls of the valve chamber 23. The valve mechanism 25 is provided at its lower end with a valve 37 adapted to be seated against a valve seat 38, which valve seat is at the upper end of the plug 27. When the valve 37 is against its valve seat 38 no compressed gas can pass downwardly through the bore 24.

The valve housing is provided with one or more downwardly extending packing cups 39 and if a plurality are employed, the same may be spaced by spacers 40. The lower end of the housing is likewise provided with one or more up-turned packing cups 41 which may be spaced apart the same as are the cups 39. Since the packing cups 39 and 41, as shown, extend vertically on the outside of the valve chamber 23, they, therefore, space the outside of this valve chamber from the inside of the sleeve 11 thereby forming a chamber 42. A port 43 extends horizontally through the wall of the valve chamber 23 which port communicates with the said chamber 42 and with the lower portion of the valve chamber 23.

The operation of this valve mechanism is as follows. The macaroni tubing 26 may be lowered in the tubing 3 and compressed air may be introduced into the macaroni tubing. This compressed air would force the valve 37 against its valve seat 38 and would prevent a flow of compressed gas through the valve mechanism. This would result in a pressure in the bore 21 which would force the plunger 28 to its outer position, compressing the spring 30 and positioning the outer end of the plunger in such a position that the channel 32 would be in position to engage the upper end 33 of the sleeve 11 when the valve mechanism was lowered sufficiently for the said plunger to engage the said sleeve and when lowered to this position, the parts would be in the position shown in Fig. 5. It will be noted that the valve mechanism has engaged the semi-spherical end of the knob 18 and has compressed the spring 17 and opened the valve 16 so that the compressed air from the chamber 7 can pass by the valve 16 into the chamber 42 and through the port 43 into the lower portion of the valve chamber 23, that is, that part thereof below the flange 36. If the pressure in the macaroni tubing 26 and the pressure in the chamber 7 were the same, the weight of the valve member 25 would cause the valve 37 to remain on its seat 38 and no compressed air would pass from the chamber 7 through the bore 24 and outwardly into the enlarged chamber 8. However, if the pressure in the chamber 7 were increased, this increased pressure would be received by the flange 36 so that the valve member 25 would now become unbalanced and would move upwardly from its seat 38 so that the gas pressure from the chamber 7 would now pass by the valve 16, through the chamber 42, port 43, chamber 23, and bore 24 thereby aerating and lifting that part of the oil in the flow line above the valve mechanism. However, it would generally be preferable instead of increasing the pressure in the chamber 7 to decrease the pressure in the macaroni tubing 26 thereby relieving the pressure on the upper end of the valve member 25 so that the valve member opens, and when open, that part of the oil in the tubing above the valve mechanism would be aerated as hereinbefore described. Either method would work, but I consider the latter method to be preferable because of the relatively small quantity of compressed air in the small macaroni tubing as compared with a large quantity thereof in the casing.

When I have lifted the oil above the enlarged chamber 8 I wish to lower the valve mechanism into the enlarged chamber 9. I do this by simply raising the macaroni tubing slightly so as to disengage the plunger 28 from the upper end 33 of the sleeve 11. If I now decrease the pressure in the macaroni tubing 26, the valve member 25 remains closed, the spring 30 will move the plunger 28 inwardly so that its outer end can pass downwardly through the sleeve 11. I now lower the valve mechanism and after it has passed beyond the sleeve 11, I increase the pressure in the macaroni tubing 26 so as to cause the plunger 28 to again be projected so that when it reaches the sleeve of the chamber 9, it will engage said sleeve and properly position the valve mechanism in the chamber 9. The construction of the chamber 9 is identical with that of the chamber 8 and I would then operate the mechanism so as to lift the oil above the chamber 9 in identically the same manner as described in connection with the chamber 8.

In Fig. 5 the cup packers 39 and 41 are, of course, employed to prevent the escape of compressed gas from the chamber 42 upwardly or downwardly between the valve housing and the sleeve 11. Other forms of packers, of course, may be employed such as the arrangement shown in Fig. 3.

Fig. 3 shows an alternative form of packing arrangement from that shown in Fig. 5. In this construction the macaroni tubing 26 supports a valve housing 44 which has a plug 45 screwed to the lower end thereof. Extending vertically through the housing 44 and communicating with the macaroni tubing 26 is a passageway 46 which in turn communicates with an enlarged bore forming a chamber 47 in which a valve member 48 is movable. The valve member 48 is provided with upper and lower flanges 49 and 50 which like the flanges 35 and 36 prevent the passage of compressed air upwardly or downwardly past said flanges. The valve member 48 at its lower end forms a valve 51 adapted to be seated against a valve seat 52 at the upper end of the plug 45 and a passageway 53 extends vertically through the plug 45. This passageway 53 extends from the lower end of the chamber 47 through the lower end of the plug 45 and communicating with the space in the chamber 8 which corresponds to the chamber 8 of Fig. 5.

The sleeve 11' corresponding to the sleeve 11 of Fig. 5 has near its lower end an inwardly extending flange forming a seat 54 to receive a ring 55 which ring is slidable on the outside of the valve housing 44. The plug 45 carries an outwardly projecting flange 56 which when the valve housing is elevated prevents the ring 55 from moving below the flange 56 or as otherwise expressed from dropping off of the valve housing. Above the ring 55 is a resilient packer 57 which is an annular ring made of rubber, duprene, neoprene or other resilient material. Above the packer 57 is a spacer 58 which spacer is annular in plan view and I-shaped in vertical cross-sectional view as shown in Fig. 3, thereby providing a space 59 between the outer surface of the spacer 58 and the inner surface of the sleeve 11' and forming a space 60 between the inner portion of the spacer and the outer surface of the housing 44. This spacer is provided with ports 61 connecting the two spaces 59 and 60. The space 59 communicates with the pipe 10' which like the pipe 10 in Fig. 5 extends through the sleeve and the wall of the chamber and thereby communicates with the compressed air space 7 in the casing. Above the spacer 58 is an annular packer 62 which is the same form of packer as the packer 57. The housing 44 carries an annular shoulder 63 which overlies the upper end of the packer 62.

The operation of the structure shown in Fig. 3 is very similar to the description heretofore given in connection with the valve mechanism shown in Fig. 5, the principal differences being the packing arrangement, and furthermore, the structure shown in Fig. 3 is not adapted to pass through successive sleeves as is the structure shown in Fig. 5. When the structure shown in Fig. 3 is employed there would be only one enlarged chamber 8' in the tubing and therefore only one sleeve 11'. The valve housing would be lowered on the macaroni tubing 26 until the ring 55 engaged the shoulder 54 of the sleeve and upon further lowering the macaroni tubing the shoulder 63 would continued to move downwardly while the ring 52 is held against such movement thereby compressing the two packers 57 and 62 so as to effectively prevent compressed gas passing upwardly or downwardly by such packers. If we now reduce the pressure in the macaroni tubing 26 while the pressure in the chamber 7 in the casing remains constant so that the pressure acting on the upper surface of the valve member 48 is less than the pressure acting upwardly thereon, the valve member 48 would be elevated so that the valve 51 would be moved away from the valve seat 52 and thereupon compressed gas from the chamber 7 in the casing would pass through the pipe 10' into the space 59 thence through the ports 61 and the space 60 and thence through the port 64 extending through the housing 44 and communicating with the space 49 and the portion of the chamber 47 below the flange 50 and thence through the lower portion of the chamber 47 and through the passageway 53 so that this compressed gas now passes into the chamber 8' aerating and lifting the oil above said valve mechanism. When, however, we increase the pressure of the compressed gas in the macaroni tubing 26 the valve 51 would again be seated on its valve seat 52 thereby stopping the passage of the compressed gas from the chamber 7 in the casing into the chamber 8'. After the head of oil in the tubing had again been built up to a point above the valve mechanism, the mechanism located above the ground, and which will hereinafter be described, would again be operated so as to decrease the pressure in the macaroni tubing and open the valve.

In Figs. 2 and 4 I show a modification of the structure heretofore described. The casing 1 and the conventional tubing 3 is employed as is the macaroni tubing 26. A single enlarged chamber 8'' having a pipe 10 leading into a sleeve 11 are likewise employed, all of which structure is substantially the same as the structure described in connection with Fig. 1. The enlarged chamber 8'' receives a connection 65 which is welded thereto at 66 and within the connection 65 is a member 67 having a passageway that communicates with the interior of the lower portion of the sleeve 11 and which passageway extends outwardly and downwardly through the connection 65 and communicates with a pipe 68 which extends to a connection 69 surrounding the tubing and which connection carries a chamber 7 surrounding the lower end of the tubing and provided at its lower end with a one-way valve 71 and strainer 72. The connection 69 is provided with a passageway 73 connecting the lower end of the pipe 68 with the interior of the chamber 70. A suitable packer 74 may be employed to seal the space between the connection 69 or the chamber 70 and the casing 1. The tubing 3 is provided with a port 75 which port is positioned in that part of the tubing within the chamber 70 and just below the connection 69 which forms the upper closure member of the chamber 70. The valve mechanism shown in Fig. 3 may be suitably employed in connection with the structure shown in Figs. 2 and 4 and when the macaroni tubing 26 is lowered so that the ring 55 engages the seat 76 at the upper end of the member 67, the packers will be compressed as heretofore described and the valve member 48 would be operated in precisely the same manner as heretofore described, with the exception that instead of the compressed gas passing downwardly from the passageway 53 directly into the tubing, it would pass downwardly through the member 67, pipe 68, passageway 73 into the chamber 70 and thence upwardly through the extreme lower end of the tubing, thereby elevating all of the oil in the tubing. The port 75 is provided so that the trapped gas in the chamber 70 above the lower end of the tubing may bleed through the said port.

When a plurality of chambers such as 8 and 9 are employed, such as shown in Fig. 1, the valves 16 prevent any passage therethrough of the compressed air unless and until the valve mechanism is seated in its sleeve. In this construction the compressed air in the chamber 7 is, therefore, not wasted by flowing into the tubing when the removable valve mechanism is not in position. If desired, a valve similar to the valve 16 may be used in connection with the disclosure in the remaining views but when only one enlarged chamber is employed such as 8' in Fig. 3, the valve 16 is ordinarily not necessary for in Fig. 3 the removable valve mechanism would ordinarily be in its sleeve so that the gas would not be unnecessarily wasted.

Various forms of surface operated mechanism may be employed. In Fig. 6 I show one such form in which a compressed air supply pipe 77 is used. If desired, a valve 78 may be employed to cut off the supply of air and a pressure regulator 79 may also be employed. The pipe 77 is provided with a branch 80 leading to the casing and in this branch I provide a valve 81. Connected to the pipe 77 is also a branch 82 leading to a three-way valve 83. This valve may be the well-known Fisher valve provided with a clock mechanism 84 which may be adjusted to intermittently operate a diaphragm mechanism 85 to which is connected a valve stem 86 carrying a valve 87. The three-way valve member 83 is provided with a partition 88 having a central aperture through which the valve stem passes and forming a valve seat. Below the partition is a chamber 89 which when the valve is in the position shown in Fig. 6 communicates with the branch 82 as well as with a pipe 90 connected to the macaroni tubing 26. When the parts are in the position shown in Fig. 6 and if the valves 78 and 81 are open, the compressed air supplied through the pipe 77 will pass into the casing, through the branch 80 as well as through the branch 82 and thence through the chamber 89 and pipe 90 into the macaroni tubing. At suitable intervals the governing means 84, which may be a clock system, would control the operation of the diaphragm mechanism 85 and would cause the valve stem 86 to move downwardly so that the valve 87 seats on a valve seat 91 at the upper end of the branch 82 so that no more compressed air can be fed into the pipe 90 and macaroni tubing 26. The compressed air in the macaroni tubing can now flow outwardly through the pipe 90, chamber 89, upwardly through the port in the partition 88 and thence through a pipe 92 having a back pressure regulator 93 therein and thence escaping into the atmosphere. This back pressure regulator may be of any improved type such as the Grove reducing regulator. The clock mechanism 84 may be set to govern the diaphragm so that it would be operated every three minutes or every two days, depending upon the wish of the operator, which naturally would be dependent upon what he knows of the well conditions. This clock mechanism may likewise be set so as to hold the valve member 25 or 48 open for any given length of time dependent upon how long the operator thinks it would take to complete the lifting operation or at least how long the operator thinks it will be necessary to introduce the compressed air into the tubing. If, for instance, the operator wishes to set the clock mechanism so as to maintain the valve stem in the position shown in Fig. 6 for any given length of time, the valve member 25 for instance would correspondingly remain in its lower position so that no compressed air is introduced from the casing into the tubing. If the operator wishes the compressed gas to pass at the end of this period of time from the casing into the tubing for a given length of time, he would set his clock mechanism accordingly and the clock mechanism would control the diaphragm mechanism so that the valve stem 86 would be moved downwardly from the position shown in Fig. 6 so that the valve 87 would remain on its valve seat 81 for the said given period of time. The pressure in the macaroni tubing would therefore be reduced for that same period of time by the compressed air therein flowing through the pipe 90 and through the back pressure regulator 93 and outwardly through the tubing 92 thereby decreasing the pressure on the upper end of the valve member 25 so that the said valve member would be elevated and the compressed gas would therefore pass from the chamber 7 in the casing by the valve 37 and into the tubing, thereby aerating and lifting the oil therein so that it could be expelled through the pipe 94 leading from the upper end of the tubing to the oil storage tank, not shown.

In Fig. 7 I have shown an alternative arrangement from that shown in Fig. 6. Gas would be supplied to the casing through a pipe 95 having a pressure regulator 79 therein, which pipe communicates with a branch 96 leading into the casing, which pipe 96 may be provided with a valve 81. A branch 97 also communicates with the pipe 95 and leads to the macaroni tubing 26. A valve 98 is interposed in the branch 97. A pipe 99 is connected to the macaroni tubing 26 and in this pipe is a valve 100 and a back pressure regulator 93. If the operator opens the valves 81 and 98, the compressed gas from the pipe 95 will be led through the branches 96 and 97 to the macaroni tubing and to the casing so that the pressures on the upper and the lower ends of the valve, such as the valve member 25 in Fig. 5, would be equal and no compressed gas could pass from the chamber 7 into the tubing. If, however, the operator closed the valve 98 and opened the valve 100, the pressure in the macaroni tubing would be decreased and the valve member 25 in Fig. 5 or 48 in Fig. 3 would be elevated so that gas would now pass from the chamber 7 into the tubing. The essential difference between the structure shown in Fig. 7 and that shown in Fig. 6 is that in Fig. 6 the mechanism is set so as to be automatically operated as desired, whereas, when the structure shown in Fig. 7 is employed, the operator would have to manually operate the proper valves. While I have not shown any specific mechanism for raising and elevating the macaroni tubing, it is believed that such elevating mechanism is so well known that it requires no description and it forms no part of this invention.

I realize that many changes may be made in the specific form of the invention as shown herein by way of illustration and I desire to claim the invention broadly except as I may limit myself in the appended claims.

Having now described my invention, I claim:

1. In a gas lift mechanism for wells having a casing and a tubing with a compressed gas chamber therebetween, a differential pressure operated valve member to control the admission of compressed gas from the said chamber into the tubing, a passageway leading from one end of said valve member to the surface of the ground and having a variable gas pressure therein, and means to control the gas pressure in said passageway so as to control the opening or closing of said valve member by the differentials in pressures in the passageway and in the chamber.

2. In a gas lift mechanism for wells having a compressed gas chamber, a valve chamber having a valve seat, a differential pressure controlled valve slidable in the valve chamber to engage or disengage the valve seat, a flow line, means on the valve to separate the upper and lower portions of the valve chamber, one end of the valve chamber on one side of said means being exposed to the pressures in the gas chamber and when the valve is open, communicating with the flow line, a pipe leading to the top of the well and connected with the chamber on the other side of said means and means to increase or decrease the gas pressure in said pipe to thereby close or open said valve, said valve being controlled by the differential between the pressures in the gas chamber and the pipe.

3. In a gas lift mechanism for wells having a casing and a flow line with a compressed gas chamber therebetween, a valve chamber, a differential pressure controlled valve slidable in said valve chamber and dividing it into two sections, a compressed gas tubing leading into one of said sections of said valve chamber, the other section of the valve chamber being exposed to the compressed gases in the compressed gas chamber so that said valve may be actuated by the differentials of pressures in said compressed gas chamber and the tubing and means to increase the gas pressure in the tubing to close said valve and to decrease the gas pressure in the tubing below the pressure in the chamber to open said valve.

4. In a gas lift mechanism for wells having a casing and a flow line with a compressed gas chamber therebetween, a valve chamber, a differential pressure controlled valve slidable in said valve chamber and dividing it into two sections, a compressed gas tubing leading into one of said sections of said valve chamber, the other section of the valve chamber being exposed to the compressed gases in the compressed gas chamber so that said valve may be actuated by the differentials of pressures in said compressed gas chamber and the tubing, and means above the surface of the ground to control the pressures in the compressed gas chamber and means to decrease the pressure in the tubing below that in the chamber so that the gas pressure in the chamber will open said valve.

5. In a gas lift mechanism for wells having a casing and a flow line with a compressed gas chamber therebetween, a valve chamber, a differential pressure controlled valve slidable in said valve chamber and dividing it into two sections, a compressed gas tubing leading into one of said sections of said valve chamber, means to govern the gas pressure in said tubing, the other section of the valve chamber being exposed to the compressed gases in the compressed gas chamber so that said valve may be actuated by the differentials of pressures in said compressed gas chamber and the tubing, and means above the surface of the ground to reduce the pressure in the tubing below the pressure in the gas chamber so that the pressure in the gas chamber will open the valve and admit the gas from the compressed gas chamber into the oil in the flow line.

6. In a well having a flow line, a valve chamber, a valve member slidable therein, means carried by said valve member dividing said chamber into two sections, a compressed gas chamber communicating with one of said sections, a passageway from the last-named section leading into said flow line, a valve forming a part of said valve member and adapted to open or close said passageway, a compressed gas tubing extending from the surface of the ground to the other of said sections and means whereby the pressure of compressed gas in the tubing may be varied, the compressed gas in the gas chamber serving as a means to open said valve when the pressure in the tubing is below that in the gas chamber and the compressed gas in the tubing serving as a means to close the valve when the pressure in the tubing exceeds that in the gas chamber.

7. In a well having a flow line, a compressed gas chamber, a valve chamber, a differential pressure controlled valve slidable in the valve chamber, a passageway from the compressed gas chamber through a portion of the valve chamber and leading into the flow line, a tubing leading from the surface of the ground to said valve chamber, means to introduce compressed gas into said tubing so as to exceed the pressure in the gas chamber to move said valve to closed position and means to reduce the gas pressure in the tubing below the gas pressure in the gas chamber so that the gas pressure in the gas chamber will open said valve.

8. In a well having a flow line, a compressed gas chamber, a valve chamber, a differential pressure controlled valve slidable in the valve chamber and dividing the valve chamber into two end sections, said valve being controlled by the pressures in the two sections, means whereby one of said sections communicates with the compressed gas chamber and with the interior of the flow line when said valve is opened, a tubing extending from the surface of the ground into the other section and means whereby compressed gas in the tubing may be reduced below the pressure in the gas chamber so that the pressure in the gas chamber acting on one end of said valve will cause said valve to move to open position.

9. In a well having a flow line, a compressed gas chamber, a valve chamber, a differential pressure controlled valve slidable in the valve chamber and dividing the valve chamber into upper and lower sections, said valve being controlled by the pressures in the two sections, means whereby the lower of said sections communicates with the compressed gas chamber and with the interior of the flow line when said valve is opened, a tubing extending from the surface of the ground into the upper section, and means whereby compressed gas introduced by said tubing into the upper section may be varied above or below the pressure in the gas chamber to control the opening and closing of said valve.

10. In a well having a flow line, a compressed gas chamber, a sleeve in said flow line, a valve housing adapted to be lowered into said sleeve, a differential pressure controlled valve in said housing, a tubing extending to the surface of the ground and communicating with one end of said valve, means to supply compressed gas into said tubing, the lower portion of said valve being exposed to the pressures in the compressed gas chamber, said valve being controlled by the differential in the gas pressures in the tubing and the compressed gas chamber, a passageway leading from the compressed gas chamber into the tubing and being closed by said valve when the pressure in the tubing is equal to or greater than the pressure in the compressed gas chamber, said valve opening when the pressure in the tubing plus the weight of the valve is less than the pressure in the corresponding gas chamber.

11. In a well having a casing and a flow line with a compressed gas chamber between the flow line and casing, a valve housing, a valve controlled by differential pressures and movable in said housing, a passageway extending from the chamber into the flow line and communicating with the lower portion of said valve, a tubing extending from one end of the valve housing to the surface of the ground and communicating with the upper end of said valve, and means to increase the pressure in the tubing above the pressure in the gas chamber to operate said valve to close said passageway and to decrease the pressure in the tubing below the pressure in the gas chamber to operate said valve to open said passageway.

12. In a well having a flow line and a compressed gas chamber, a valve housing, a valve movable therein and dividing said housing into two compartments, a passageway extending from said chamber through one of said compartments and into said flow line, a tubing extending from the other compartment to the well surface, means to introduce a gas pressure in the tubing to operate said valve to close said passageway and to reduce the said pressure so that the pressure from the chamber will operate said valve to open said passageway.

13. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, and surface operated means to increase the pressures in the tubing so as to move said valve to close said passageway and to reduce the said pressure so that the pressure from the chamber will operate said valve to open said passageway.

14. In a well having a flow line with a compressed gas chamber outside of said flow line, a valve housing, a valve slidable therein and dividing said housing into two compartments, a passageway leading from the compressed gas chamber into one of said compartments and extending thence into the flow line, said valve serving as a means to open or close said passageway and being subjected to the pressure from said chamber, a tubing extending from the well surface and communicating with the other of said compartments, means to introduce gas pressures into said tubing to operate said valve to close said passageway and to decrease the gas pressure in said tubing so as to cause the pressure from said chamber to operate said valve to open said passageway.

15. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, and surface operated means to increase the pressures in the tubing so as to move said valve to close said passageway and to reduce the said pressure so that the pressure from the chamber will operate said valve to open said passageway, said tubing extending through said flow line.

16. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, and time cycle surface operated means to increase the pressure in the tubing so as to move said valve to close the passageway and to reduce the said pressure at the end of a time interval so that the pressure from the chamber will operate said valve to open said passageway.

17. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, and time cycle surface operated means to increase the pressure in the tubing so as to move said valve to close the passageway, and means to release the pressures in the tubing so that the pressures in the chamber will operate said valve to open said passageway.

18. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, means to introduce compressed gas into said tubing for a predetermined interval of time to actuate said valve so as to close said passageway and maintain it closed for the said interval of time, and to release the gas in the tubing at the end of said time interval so that the pressure in the chamber will operate said valve to open said passageway.

19. In a well having a flow line and a compressed gas chamber, a valve housing, a valve slidable therein and dividing the housing into upper and lower compartments, a passageway extending from the said chamber into the lower compartment and thence communicating with the flow line, a gas pressure tubing extending from the upper compartment to the well surface, a clock mechanism, a two-way valve mechanism operated thereby, a source of compressed gas, a conduit leading from said source through said valve mechanism to said tubing, a vent conduit extending from the two-way valve mechanism, and means whereby the clock mechanism actuates the two-way valve mechanism to open said first-named conduit to admit compressed gas into the tubing, and after a predetermined interval of time to close said first-named conduit and open said vent conduit so as to release the compressed gas from said tubing so that the pressure in the chamber will operate said valve to open said passageway.

RAYMOND G. TAYLOR, Jr.